(12) United States Patent
Janah et al.

(10) Patent No.: US 7,674,979 B2
(45) Date of Patent: *Mar. 9, 2010

(54) SYNTHETIC MATERIAL END FOR A DC ELECTRIC CABLE

(75) Inventors: Hakim Janah, Coulogne (FR); Pierre Mirebeau, Villebon S/yvette (FR); Josef Cardinaels, Wetteren (BE); Francois Gahungu, Calais (FR); Jerome Matallana, Sainte Marie Kerque (FR)

(73) Assignee: Nexans, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/148,135

(22) Filed: Apr. 16, 2008

(65) Prior Publication Data

US 2009/0000803 A1    Jan. 1, 2009

Related U.S. Application Data

(63) Continuation of application No. 11/373,826, filed on Mar. 9, 2006, now Pat. No. 7,414,195.

(30) Foreign Application Priority Data

Mar. 21, 2005   (FR)   ................... 05 50728

(51) Int. Cl.
    *H02G 15/02*   (2006.01)
(52) U.S. Cl. .................... 174/73.1; 174/74 R
(58) Field of Classification Search ............. 174/73.1, 174/74 R
See application file for complete search history.

(56) References Cited

U.S. PATENT DOCUMENTS

| 6,265,663 | B1 | 7/2001 | Cicogna et al. | 174/73.1 |
| 6,395,975 | B1 | 5/2002 | Bosisio et al. | 174/25 R |
| 7,414,195 | B2 * | 8/2008 | Janah et al. | 174/73.1 |
| 2006/0124341 | A1 | 6/2006 | Perego et al. | 174/110 R |

FOREIGN PATENT DOCUMENTS

| EP | 0742628 | 5/1996 |
| EP | 1487074 | 12/2004 |
| FR | 2480039 | 10/1981 |
| JP | 10021760 | 1/1998 |
| WO | 0074191 | 12/2000 |

OTHER PUBLICATIONS

International Search Report-Dec. 21, 2005.

* cited by examiner

*Primary Examiner*—Chau N Nguyen
(74) *Attorney, Agent, or Firm*—Sofer & Haroun, LLP

(57) ABSTRACT

The invention relates to a synthetic material end for a DC electric cable. In the invention, the synthetic material end includes a composite insert that is placed between the inner insulator and the outer insulating sleeve of the cable, the insert generally being in the form of a sheath surrounding the inner insulator over a partially-stripped portion of the cable, and being made up of a resistive portion of high resistivity, and of a semi-conductive portion of lower resistivity, the interface between said resistive and semi-conductive portions forming a deflector, the end of the resistive portion that is remote from the deflector being electrically connected to the central conductor of the cable, and the end of the semi-conductive portion that is remote from the deflector being electrically connected to the outer semi-conductor of the cable. Application to making connections to high-voltage electric cables.

14 Claims, 2 Drawing Sheets

SYNTHETIC MATERIAL END FOR A DC ELECTRIC CABLE

RELATED APPLICATION

This application is a continuation application of U.S. patent application Ser. No. 11/373,826 filed on Mar. 9, 2006 now U.S. Pat. No. 7,414,195 which in turn claims the benefit of priority from French Patent Application No. 05 50728, filed on Mar. 21, 2005, the entirety of which are incorporated herein by reference.

FIELD OF THE INVENTION

The present invention provides a synthetic material end for a DC electric cable, said end making it possible connect a medium- or high-voltage electric cable to equipment, such as a line for transporting electricity under high voltage.

BACKGROUND OF THE INVENTION

The electric cable is constituted by: a central conductor surrounded by a plurality of layers constituting an insulation system; at least one metal screen connected to ground; and a protective outer sheath. In particular, the various components of the cable have the function of protecting people and animals against electrocution, of avoiding electric discharges in the medium surrounding the cable, such as air, and of minimizing energy losses while electricity is being transported. However, at the end of the cable, the central conductor under high voltage is at a distance of only a few millimeters from the metal screen connected to ground. This distance is much shorter than the breakdown voltage of the medium in which the end of the cable is situated (e.g. air), thereby leading to a short-circuit. Given the magnitude of the electric field existing in the insulating portions of a cable system, in particular in the vicinity of interfaces, it is necessary to control electric field density by arranging the end structures of cables under high voltage to comply with an additional constraint whereby the end of a cable must not be destroyed in the event of a voltage surge or an electric shock caused by lightning, for example.

Patent application WO 00/74191 A1 describes a high-voltage cable end structure comprising a resistive layer that surrounds the cable, and that is connected at one of its ends to the high-voltage, and at its other end to ground. A stress cone surrounds the resistive layer beside its portion connected to ground. However, that structure can lead to unsatisfactory performance in the event of a surge, or during operations such as circuit-breaking, or reversing polarity, for example.

Patent application FR 2 480 039 proposes using an electrode for reducing electrical stress at the edge of the screen, around the periphery of the insulator of the electrical conductor. The electrode comprises a plurality of contiguous zones presenting different resistances. The resistance of the stress electrode is selected to be non-linear. It varies as a function of the applied voltage, such that the magnitude of the current passing through the electrode does not vary linearly with the voltage. In addition, the stress electrode is floatingly mounted at one of its two ends. The structure proposed in that patent application presents the drawback of operating in unsatisfactory manner with DC.

OBJECTS AND SUMMARY OF THE INVENTION

The present invention proposes an end for an electric cable, the end being made of synthetic material presenting a satisfactory lifetime, operating in satisfactory manner under high voltage DC, and being capable of withstanding relatively large surges. The term "synthetic material" means that the end is made out of solid materials (such as polymers, for example), and therefore does not use any liquid (such as oil). By way of example, the operating voltage can be of the order of 150 kilovolts (kV) with DC, with continuous and lightning surge test voltages close to 300 kV and 350 kV respectively.

More precisely, the present invention proposes a synthetic material end for a DC electric cable, said end comprising a central conductor for putting under high voltage, and surrounded successively by an inner semi-conductor, an insulator, an outer semi-conductor, and a metal screen for connection to ground, in which the end of the cable is partially stripped by removing the outer semi-conductor and the metal screen. The synthetic material end that includes an outer insulating sleeve further includes a composite insert that is placed between the inner insulator of the cable and the outer insulating sleeve, the insert generally being in the form of a sheath surrounding the inner insulator over the partially-stripped portion of the cable, and being made up of a resistive portion of high resistivity, and of a semi-conductive portion of lower resistivity, the interface between said resistive and semi-conductive portions forming a deflector, the end of said resistive portion that is remote from the deflector being electrically connected to the central conductor, and the end of the semi-conductive portion that is remote from the deflector being electrically connected to the outer semi-conductor.

In advantageous manner, the resistivity of said resistive portion of the insert is several orders of magnitude smaller than the resistivity of the inner insulator of the cable. The transverse volume resistivity of the resistive portion may lie in the range $10^{11}$ ohm-centimeters ($\Omega \cdot cm$) to $10^{14} \Omega \cdot cm$ in the range 20° C. to 90° C. for an applied electric field lying in the range 5 kilovolts per millimeter (kV/mm) to 50 kV/mm, and may for example be made out of cross-linked synthetic elastomer of the ethylene-propylene terpolymer rubber (EPDM) type.

The longitudinal volume resistivity of the semi-conductive portion of the insert is advantageously of the same order of magnitude as the resistivity of the outer semi-conductor of the cable, and may for example lie in the range 100 $\Omega \cdot cm$ to 10000 $\Omega \cdot cm$ in the temperature range 20° C. to 90° C.

In a preferred embodiment, the end of said semi-conductive portion of the insert that is remote from said deflector, covers the stripped end of said outer semi-conductor.

In an advantageous embodiment, at its end, the central conductor includes a stripped portion starting at the end of said resistive portion of the insert that is remote from the deflector, said synthetic material end including means for electrically connecting said stripped portion to said end of the resistive portion of the insert.

In an advantageous embodiment, the outer insulating sleeve covers the end of the semi-conductive portion of the insert that is remote from the deflector, and is substantially set back from the end of the resistive portion of the insert that is remote from the deflector. The central conductor is terminated by a connection terminal lug, and, at the high-voltage end, an insulating part covers the end of the outer insulating sleeve as far as the connection terminal lug.

Preferably, the outside surface of the outer insulating sleeve is generally in the form of a set of insulating fins, and, at the ground end, the outer insulating sleeve is terminated by a stress cone.

BRIEF DESCRIPTION OF THE DRAWINGS

Other advantages and characteristics of the invention appear from the following description of an embodiment of the invention, given by way of non-limiting example, and with reference to the accompanying drawings, and in which.

MORE DETAILED DESCRIPTION

In general, a cable for transporting electricity under high voltage of the order of 150 kV or more is made up of a central conductor (or a central core) that is surrounded successively by: an inner semi-conductor (also referred to as "an on-conductor screen") having the purpose of obtaining equipotential surfaces of substantially cylindrical shape around the conductor; an insulator; an outer semi-conductor (also referred to as "an on-insulator screen"); a metal screen connected to ground; and finally an outer sheath. The main functions of the metal screen are to protect people and animals in the event of contact with the cable, and to carry capacitance or short-circuit current in the event of a surge as a result of lightning, for example.

By way of example, for a cable having a diameter of 95 square millimeters (mm$^2$), the total thickness of the insulating layers is about 5 millimeters (mm). At the end of the cable, in other words at its end that is generally in air, the distance between the central conductor and the metal screen is therefore only 5 mm. This distance is far too short to avoid a short-circuit between the central conductor under high voltage and the metal screen connected to ground. The structure of the synthetic material ends aims to increase this radial distance of 5 mm to a longitudinal distance that can be about 1.5 meters (m), for example. The end of the cable is thus partially stripped over this longitudinal distance, so as to bare the central conductor at the end of the cable in order to be able to make a connection to it. Naturally, the synthetic material end of the present invention relates to cables that are not limited to diameters of about 95 mm$^2$, but that can reach 1600 mm$^2$ or more.

Figure 1:
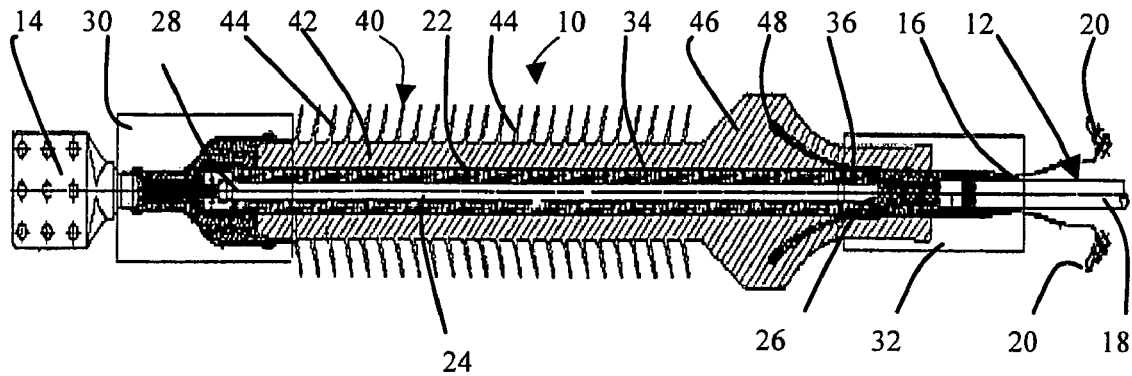
FIG. 1 is a general longitudinal section view of an embodiment of the invention.

In FIG. 1, the synthetic material end 10 of the invention includes a portion that is connected to the cable 12, and that is situated on the righthand portion in FIG. 1 ("the ground end"), and a portion that is intended to be connected to high voltage via a connection terminal lug 14, and that is situated on the lefthand portion in FIG. 1 ("the high-voltage end"). The end of the cable is partially stripped by removing the outer sheath 18, the metal screen 16, and the outer semi-conductor, as described in detail below with reference to FIG. 5. The metal screen 16 of the cable is connected to ground terminals 20.

Figure 3:
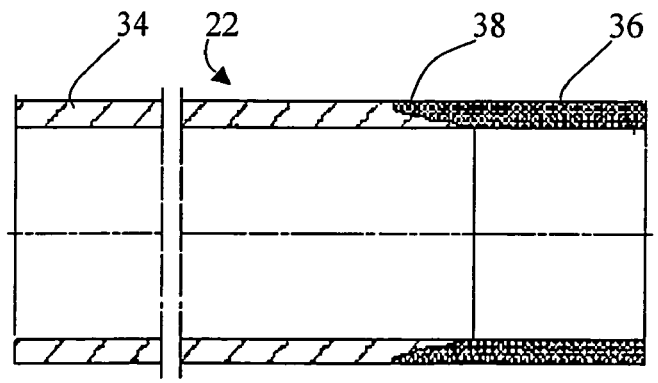
FIG. 3 is a longitudinal section of the insert at the deflector.

In the invention, the synthetic material end 10 includes an insert 22 that surrounds the insulator 24 of the cable like a sheath. From its end next to the cable 12, the insert extends from the end 26 of the outer semi-conductor, which it covers a little, as far as the end 28 of the insulator 24 at the high-voltage end (the portions of the synthetic material end 10 in the rectangles 30 and 32 are described in detail below with reference to FIGS. 4 and 5). The insert 22 is made up of two adjacent portions, a first portion 34, referred to as the resistive portion, and a second portion 36, referred to as the semi-conductive portion, said portions having an interface that forms a deflector 38 (see FIG. 3). The deflector has a flared shape with its widest portion situated at its junction with the resistive portion 34 of the insert. The resistive portion of the insert is made out of a resistive material that is normally designated by EPDM (a cross-linked synthetic elastomer) having resistivity that is several orders of magnitude less than the resistivity of the insulator of the cable for a given applied electric field and a given temperature. The resistivity of the resistive portion of the insert can lie in the range $10^{11}$ Ω·cm to $10^{16}$ Ω·cm, e.g. close to $10^{12}$ Ω·cm, whereas the resistivity of the insulator of the cable is about $10^{16}$ Ω·cm approximately. The resistivity of the semi-conductive portion of the insert, situated at its cable end, is close to the resistivity of the outer semi-conductor of the cable. By way of example, it can lie in the range 100 Ω·cm to 10000 Ω·cm, e.g. close to 300 Ω·cm. The resistances of the resistive and semi-conductive portions of the insert are substantially linear, and therefore depend little on the electric field to which they are subjected. The insert acts as an active electric field distributor that is active with DC, providing a substantially linear resistive decrease in voltage from the high-voltage end to the ground end. By way of example, the total length of the insert can be approximately equal to 1.5 m, and its thickness can be about 10 mm, with a length for the deflector 38 equal to about 0.10 m.

An electrically insulating sleeve 40 surrounds the insert 22 over practically its entire length. It is advantageously made out of silicone rubber commonly known as LSR (Liquid Silicon Rubber). The insulating sleeve 40 is made up firstly of a portion 42 extending as far as the high-voltage portion, and having an outside surface that is formed by a succession of insulating fins 44, and secondly of a stress cone 46 that is adjacent to the portion 42. A field deflector 48 made out of a semi-conductive material is situated inside the cone 46. The deflector 48 is electrically connected to the semi-conductive portion 36 of the insert 22. Ideally, the purpose of the deflector is to ensure that the electric-field lines remain parallel to the axis of the electric conductor. In addition to its dielectric insulating function, the insulating sleeve 40 has a climatic function as a result of its fins 44 that serve to lengthen the path followed by the leakage current that propagates along the outside surface of the sleeve on which a conductive layer tends to become deposited as a result of rain and pollution.

Figure 2:
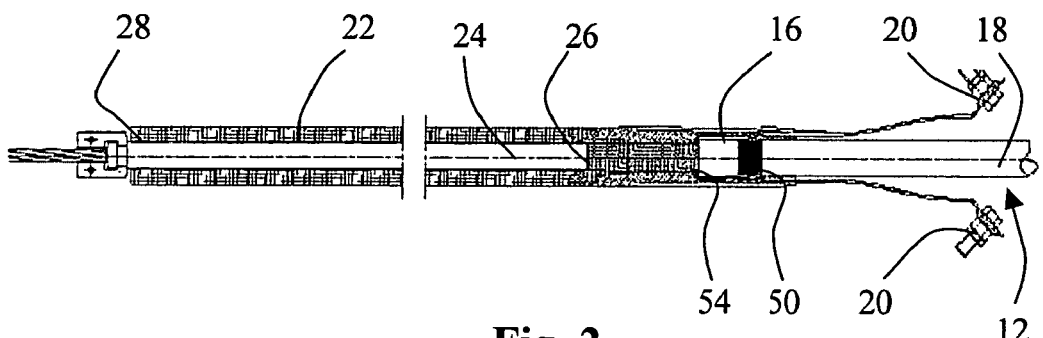
FIG. 2 shows an insert of the invention disposed around the inner insulator of the cable.

FIG. 2 shows the cable 12 and the insert 22 engaged on the inner insulator 24 of the cable. The sheath 18 of the cable 12 is removed completely, starting from point 50 and going towards the high-voltage end (towards the left side of the figure). The metal screen 16 connected to the ground sockets 20 is also removed, starting from point 54 and going towards the high-voltage end. The outer semi-conductor of the cable is removed starting from point 26 and going towards the high-voltage end. The insert 22 and the inner insulator 24 extend as far as point 28, after which point they leave the central conductor visible.

Figure 4:
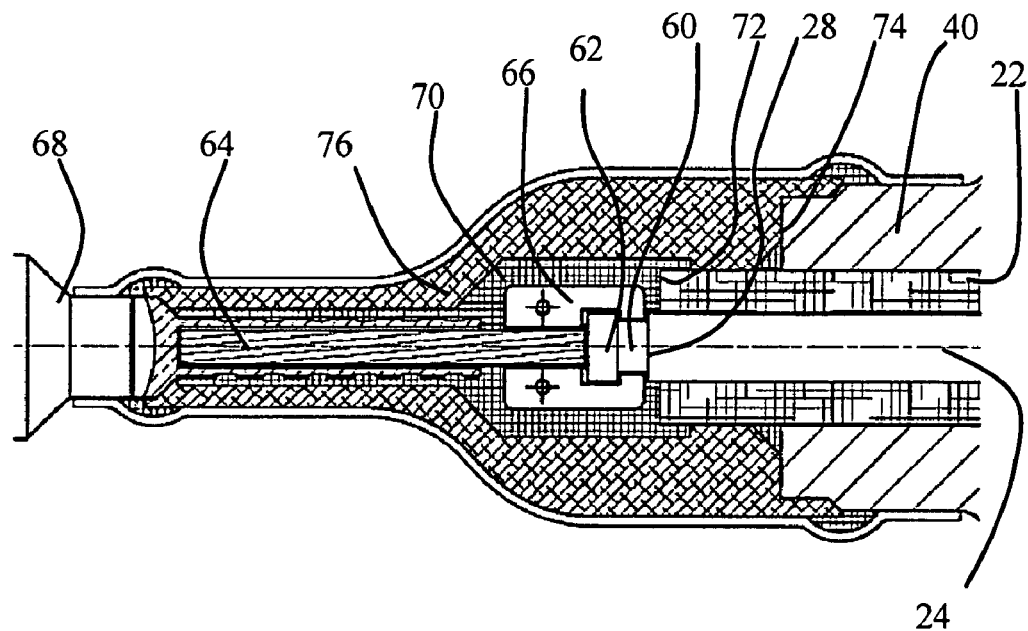
FIG. 4 is a longitudinal section showing the connection of the synthetic material end to high voltage.

FIG. 4 is a detail section view showing the high-voltage end, defined by the rectangle 30 in FIG. 1. The central conductor 60 projects from the inner insulator 24 at the end 28 of said insulator, and it is terminated by a machined ring 62. The central conductor is connected to a twisted multistrand conductor 64 by means of a metal anti-retraction shell 66 made of half-shells that clamp firstly on the end of the central conductor 60, and secondly on the multistrand conductor 64, so as to prevent the cable from retracting and from being stripped. At its end 68, the multistrand conductor 64 is connected to the connection socket 14 in FIG. 1. A molded conductive part 70 surrounds the end 72 of the insert 22, the shell 66, and the multistrand conductor 64. These elements 70, 22, 66, and 64 therefore have the same electric potential, namely the high voltage of the central conductor 60, as a result of the connection means constituted by the part 70. The end 72 of the resistive portion 34 of the insert 22 is therefore electrically connected to high voltage. The end 74 of the insulating sleeve 40 is set back a little from the end 72 of the insert 22. A cap 76 made out of insulating material, e.g. out of silicone or out of EPDM, surrounds the molded part 70, and the ends of the insulating sleeve 40, and of the insert 22.

Figure 5:
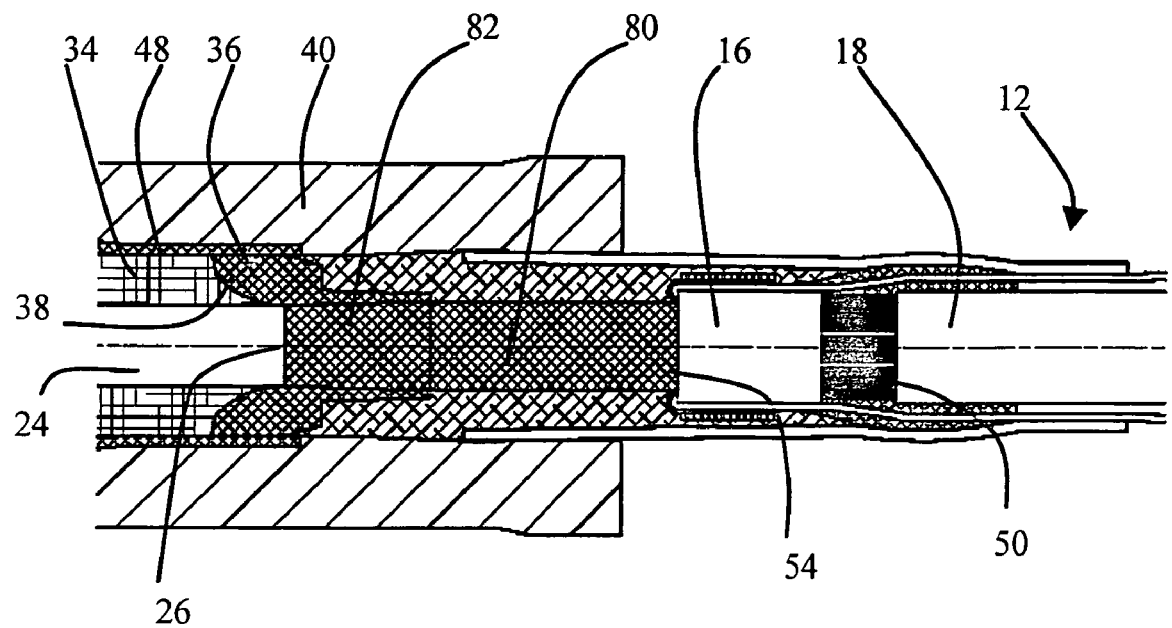
FIG. 5 is a longitudinal section showing the connection of the synthetic material end at its end connected to the cable.

FIG. 5 is a detail section view showing the cable or ground end of the synthetic material end 10 framed by the rectangle 32 in FIG. 1. As already mentioned with reference to FIG. 2, the sheath 18, the metal screen 16, and the outer semi-conductor 80 of the cable 12 are removed starting from points 50, 54, and 26, respectively, and going towards the high-voltage end. The semi-conductive portion 36 of the insert 22 surrounds the end 82 of the outer semi-conductor 80 of the cable 12. The outer semi-conductor 80 is in contact with the metal screen 16 that is connected to ground: said outer semi-conductor is therefore electrically connected to ground. The same applies to the semi-conductive portion 36 of the insert. FIG. 5 shows the start of the field deflector 48 in contact with the semi-conductive portion 36 of the insert 22. The deflector 38 forms the interface between the resistive and semi-conductive portions 34 and 36 of the insert. The deflector 38 is situated below the beginning of the deflector 48, with both deflectors being in contact. Good electrical continuity is thus obtained between the two deflectors. The outer insulating sleeve 40 covers both the end of the outer semi-conductor 80 of the cable, and the semi-conductive portion 36 of the insert.

By means of the insert of the present invention, the potential drop between high voltage and ground potential is progressive. The electric field rises along the insert instead of disappearing suddenly, by increasing at the end of the outer semi-conductor when the insert is absent. As a result of the progressive electric field gradient, the DC behavior of the synthetic material end is improved, as is its lifetime.

What is claimed is:

1. A synthetic material end for a DC electric cable comprising:
    a central conductor for putting under high voltage, and surrounded successively by an inner insulator;
    an outer semi-conductor; and
    a metal screen for connection to ground, in which the end of the cable is partially stripped by removing the outer semi-conductor and the metal screen, the synthetic material end that includes an outer insulating sleeve having a stress cone and including a field deflector made out of a semi conductive material, said synthetic material end further including
    a composite insert that is placed between said inner insulator and said outer insulating sleeve, said insert generally being in the form of a sheath surrounding said inner insulator over the partially-stripped portion of the cable, said insert being made up of a resistive portion of high resistivity, and of a semi-conductive portion of lower resistivity, the interface between said resistive and semi-conductive portions forming a deflector where the resistivity of said resistive portion of said insert is several orders of magnitude smaller than the resistivity of said inner insulator of said cable,
    the end of said resistive portion that is remote from the deflector being electrically connected to the central conductor, and the end of the semi-conductive portion that is remote from the deflector being electrically connected to the outer semi-conductor.

2. A synthetic material end according to claim 1, wherein the transverse volume resistivity of said resistive portion of the insert lies in the range $10^{11}$ Ω·cm to $10^{16}$ Ω·cm in the range 20° C. to 90° C. for an applied electric field lying in the range 5 kV/mm to 50 kV/mm.

3. A synthetic material end according to claim 1, wherein said resistive portion of the insert is made out of cross-linked synthetic elastomer.

4. A synthetic material end according to claim 3, wherein said resistive portion of the insert is made out of EPDM.

5. A synthetic material end according to claim 1, wherein the resistivity of the semi-conductive portion of the insert is of the same order of magnitude as the resistivity of the outer semi-conductor of the cable.

6. An synthetic material end according to claim 5, wherein the longitudinal volume resistivity of said semi-conductive portion of the insert lies in the range 100 Ω·cm to 10000 Ω·cm in the temperature range 20° C. to 90° C.

7. A synthetic material end according to claim 1, wherein the end of said semi-conductive portion of the insert that is remote from said deflector, covers the stripped end of said outer semi-conductor.

8. A synthetic material end according to claim 1, wherein, at its end, the central conductor includes a stripped portion starting at the end of said resistive portion of the insert that is remote from the deflector, said synthetic material end including means for electrically connecting said stripped portion to said end of the resistive portion of the insert.

9. A synthetic material end according to claim 1, wherein the end of said central conductor is connected to a multistrand conductor by means of a connection piece.

10. A synthetic material end according to claim 1, wherein said outer insulating sleeve covers the end of the semi-conductive portion of the insert that is remote from the deflector, and is substantially set back from the end of the resistive portion of the insert that is remote from the deflector.

11. A synthetic material end according to claim 10, wherein said central conductor is terminated by a connection terminal lug, and wherein, at the high-voltage end, an insulating cap covers the end of said outer insulating sleeve as far as said connection terminal lug.

12. A synthetic material end according to claim 1, wherein the outer surface of said outer insulating sleeve is generally in the form of a set of insulating fins, and wherein, at the ground end, said outer insulating sleeve is terminated by said stress cone.

13. A synthetic material end according to claim 12, wherein said field deflector is placed inside said stress cone, and is electrically connected to said outer semi-conductor of said cable.

14. A synthetic material end according to claim 13, wherein a portion of said field deflector of the outer insulating sleeve surrounds said deflector of the insert, at least in part, said deflectors being in electrical contact so as to form electrical continuity.

* * * * *